R. E. BRAND.
Hat Ironing-Machines.
No. 152,966. Patented July 14, 1874.
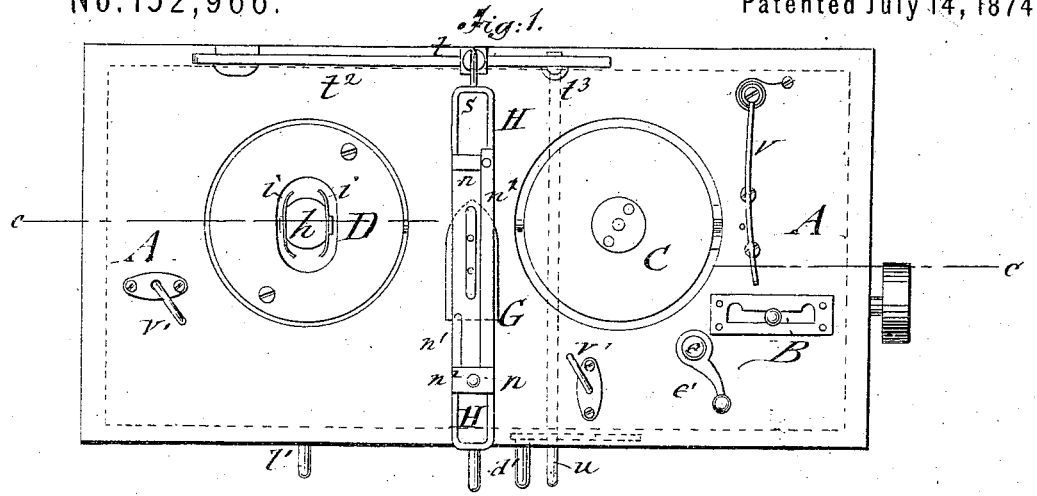
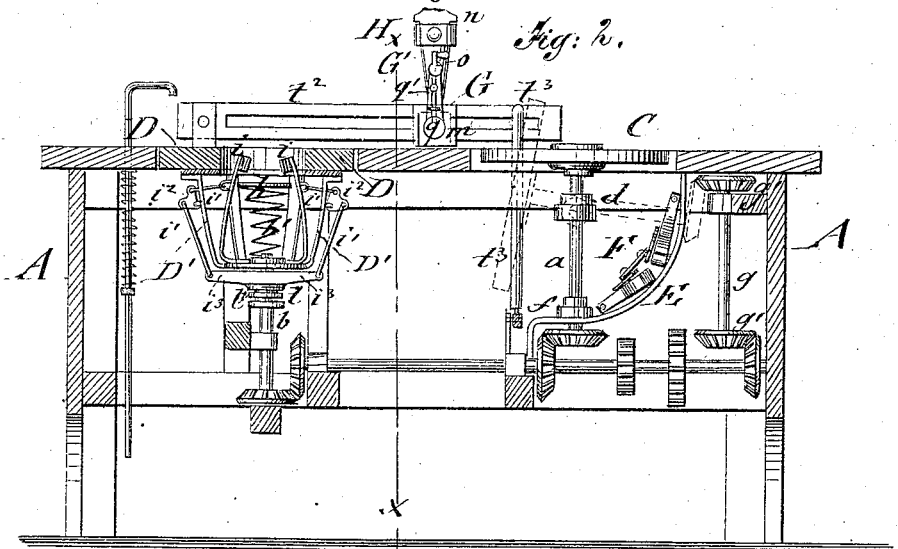
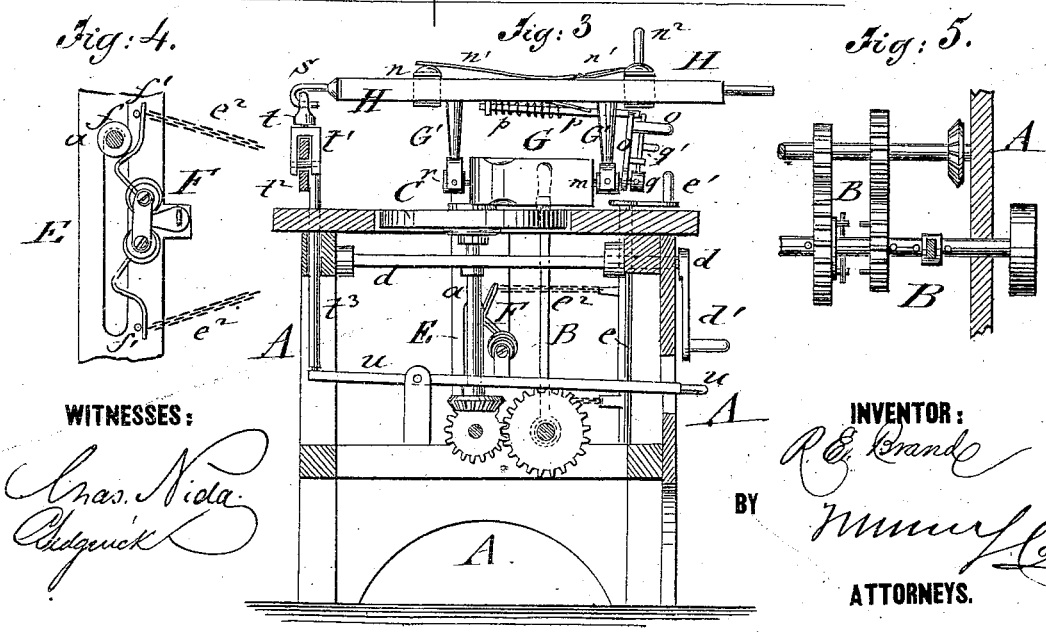
WITNESSES:
INVENTOR:
R. E. Brand
BY
ATTORNEYS.

UNITED STATES PATENT OFFICE.

ROBERT E. BRAND, OF PLAINFIELD, NEW JERSEY.

IMPROVEMENT IN HAT-IRONING MACHINES.

Specification forming part of Letters Patent No. 152,966, dated July 14, 1874; application filed April 18, 1874.

*To all whom it may concern:*

Be it known that I, ROBERT E. BRAND, of Plainfield, in the county of Union and State of New Jersey, have invented a new and Improved Hat-Ironing Machine, of which the following is a specification:

In the accompanying drawing, Figure 1 represents a top view of my improved hat-finishing machine; Fig. 2, a vertical longitudinal section on the line $c$ $c$, Fig. 1; Fig. 3, a vertical transverse section of the same on the line $x$ $x$, Fig. 2. Fig. 4 is a detail side view of the spring-brake or clamping device for retaining the rotating disk-shaft in vertical or horizontal position, and Fig. 5 a detail top view of the clutch mechanism for throwing the apparatus in and out of gear.

Similar letters of reference indicate corresponding parts.

The object of my invention is to furnish a hat-finishing machine which is driven by steam or other motive power, so as to facilitate and expedite the finishing of hats of all kinds in a more rapid and superior manner. My invention consists of a hat-block-supporting disk, which is rotated in horizontal or vertical position by being thrown into gear with a driving-shaft. A quadrantal guide mechanism and spring-clamp carries the disk into vertical position. The top of the hat and brim are finished by the iron in the former position, the side of the hat being finished in the latter. The hat and hat-block are then transferred and adjusted to a second rotating disk, with central aperture, cushion, and spring-clamps, for finishing the under side of the brim. The finishing-iron is made adjustable in any direction, and at different height on the top of the supporting-frame, and readily used on either side, it being detachable with its supporting-frame for the exchange of the heating-iron.

In the drawing, A represents the supporting frame or table of my improved hat-finishing machine, which carries in suitable bearings the driving-shaft, and an intermediate shaft connected by gear-wheels, and thrown in and out of gear by a clutch mechanism, B. The second shaft imparts, by intermeshing conical gear-wheels, rotary motion to the vertical shafts $a$ and $b$ of the block-supporting disks C and D, which are set into corresponding recesses of the top part of frame A. Shaft $a$ of disk C is hung near its upper end to a lateral pivoted cross-piece, $d$, and set with its lower end into a slotted quadrantal guide-bracket, E, for the purpose of throwing the disk from the horizontal into vertical position by means of a hand-crank, $d'$, attached to the outer end of pivoted cross-bar $d$. The vertical and horizontal position of shaft $a$ is firmly secured by a double spring-brake or clamping device, F, which is attached to the quadrantal bracket E, and operated by a vertical shaft, $e$, with hand-crank $e^1$, connected by chains or wire ropes $e^2$ with the ends of the spring-brakes, as shown in detail in Fig. 4. The spring-brakes F act on a friction-roller, $f$, of shaft $a$, and release the same by turning crank $e^1$, the extent of forward motion of each brake being defined by stop-pins $f'$, Fig. 4. The rotary motion of shaft $a$, when thrown over into horizontal position, is produced by a vertical shaft, $g$, gearing by conical end wheels $g'$ with a similar wheel of the transmitting-shaft, and that of disk-shaft $a$. The hat-block is attached by suitable fastening-screws to the top of disk C, and one hat after the other placed thereon to be finished with the iron at the crown and upper side of the rim. For finishing the side of the hat-body disk C is thrown on its quadrantal guide-bracket into vertical position, and the hat then sidewise exposed to the finishing-iron. The front part of frame A is provided with pivoted stops for locking crank $d'$ and the disk rigidly into horizontal and vertical position if it should be necessary. The second disk D serves for the purpose of attaching the hat and finishing the under side of the brim, and is provided with a central perforation, into which the hat and hat-block are inserted. It is changed for each size of block as required in the course of working the machine. Disk D is supported on a conical bracket-frame, D', keyed by its connecting base part to the disk-shaft $b$. The base part of frame D' is provided centrally below the aperture of disk D with a cushion, $h$, attached to a spiral spring, $h'$, on which the top of the hat and block is placed, while the side of the hat is firmly held by spring-clamps $i$, which are also attached to the base of frame D', and operated by means of rods $i^1$, pivoted to elbows $i^2$ of frame D', and radial arms $i^3$ of sleeve *l*. Sleeve *l* is operated by a pivoted hand-lever, *l'*, which projects at the front of frame A and opens, when raised, the spring-clamps *i* for the insertion of the hat, while closing the clamps tightly on the hat on being released.

The finishing-iron G is a hollow casing of oblong shape, with square or other cross-section, into which the heated iron is inserted by a sliding end gate, *m*. The iron G is hung to a U-shaped support, G', which is centrally pivoted to side bars *n*, and acted upon by band-springs $n^1$, for producing the flexible motion of the iron.

The iron G may be used in every direction, and on each side successively, by turning it in support G' by means of a crank-handle, *o*, which is locked to support G' by a sliding spring-bolt, *p*, and rigidly fastened to the perforated pivot-head *q* of the gate by sliding bolt *q'*. The end of iron G, opposite to its gate, turns in a sleeve, *r*, which is pivoted to the forked arm of support G', so that iron G may not only be turned readily in the same, but also be carried in downward, direction for opening the end gate and exchanging the heating-irons. The side bars *n* slide in a slotted frame, H, and rest thereon by T-shaped lateral pieces with front handle $n^2$, so that the position of the finishing-iron G is readily changed along frame H. The rear end of frame H is attached by a hook, *s*, to a perforated swivel, *t*, which turns on a sliding piece, $t^1$, while its front end has a handle for governing the iron. Piece $t^1$ slides on a longitudinal rail, $t^2$, which is pivoted at one end to the top of frame A, and at the opposite end to a vertical rod, $t^3$, operated by a pivoted lever, *u*, from the front part of frame A. Lever *u* serves to raise or lower rail $t^2$, and with it the iron G supported thereon, so that it may be applied to high-crowned hats, and a free and unrestricted use of the same in every direction and position obtained.

The corners of the iron near its pointed end may be flattened for a short distance, for the purpose of applying full force to any point of the hat, as for cutting in the band and other purposes.

A spring-lever, *v*, attached to the top may be applied to the iron to press it firmly against the block for cutting in the band.

Spring-hooks *v'* are attached at suitable points of the table, and carried over supporting-frame H, so as to allow the operation of the iron in any position on the hat without the use of the hands.

The ready adjustability and flexibility of the iron admits of just as perfect a finish as if done by hand, while the rapid rotation of the block-supporting disks economizes time and labor, and allows even unskilled workmen to reach soon a high degree of perfection.

Having thus described my invention, I claim as new and desire to secure by Letters Patent—

1. The improved hat-finishing machine, composed of the revolving block-supporting disk C, with crank and brake mechanism to give quadrantal motion to shaft *a*, block supporting and clamping disk D, and adjustable finishing-iron G, all arranged, constructed, and operated substantially as and for the purposes set forth.

2. The disk-shaft *a*, having friction-roller *f*, in combination with spring-brake device F and crank-rod *e* $e^1$, for retaining shaft in position, as set forth.

3. The spring-brake device F, operated by chains and crank-rod, combined with stop-pins *f'* of quadrantal guide-bracket E, for defining extent of motion of brakes, as specified.

4. The revolving block-supporting disk D, provided with central hat-shaped aperture, and connected to its shaft by bracket-frame D', in combination with central crown-bearing spring-cushion *h* and body-holding spring-clamps *i*, for the purpose of receiving the hat and exposing under side of brim to iron, as set forth.

5. The combination of spring-clamps *i*, connecting lever-rods $i^1$, pivoted elbows $i^2$, arms $i^3$, and sliding sleeve *l*, with pivoted hand-lever *l'*, for opening the clamps for the insertion of the hat, as specified.

6. The sliding supporting-bars *n* of detachable frame H, combined with top band-springs $n^1$, for retaining the iron in the required position, as set forth.

7. The pivoted finishing-iron G, having crank-arm *o*, perforated pivot end *q*, and lock-bolt *q'*, in combination with spring-catch bolt *p* of support G', for turning and holding iron in any position, substantially as described.

8. The combination of revolving disk C with spring-lever *v* of table A, for pressing iron against block and cutting in the band, as set forth.

9. The described combination with finishing-iron G of pivoted support G', parallel sliding bars *n*, and detachable frame H, to enable the iron to be adjusted, as set forth.

ROBERT E. BRAND.

Witnesses:
PAUL GOEPEL,
T. B. MOSHER.